April 11, 1939.  O. RASMUSSEN ET AL  2,154,074

BRAKE

Filed Sept. 29, 1937

Inventors
Olaf Rasmussen &
Gilbert K. Hause
By Blackmore, Spencer & Flint
Attorneys Patented Apr. 11, 1939

2,154,074

UNITED STATES PATENT OFFICE 2,154,074

BRAKE

Olaf Rasmussen and Gilbert K. Hause, Dayton, Ohio, assignors to General Motors Corporation, Detroit, Mich., a corporation of Delaware Application September 29, 1937, Serial No. 166,247

1 Claim. (Cl. 188—79.5)

This invention relates to brakes, and particularly to brakes as used on the wheels of motor vehicles.

The invention, furthermore, relates to a kind of brake wherein opposed shoes are expanded into contact with the drum by floating applying means and in which said shoes are so anchored that they readily conform to the contour of the drum, and wherein changes in the anchorage take place automatically to accommodate changes in the coefficient of friction between the lining of the shoes and the drum surface.

An object of the invention is to provide a very simple adjusting means for such a brake to accommodate lining wear.

Other objects and advantages will be appreciated from the following description.

In the accompanying drawing Fig. 1 is a view in elevation of the shoe assembly.

Figure 1:
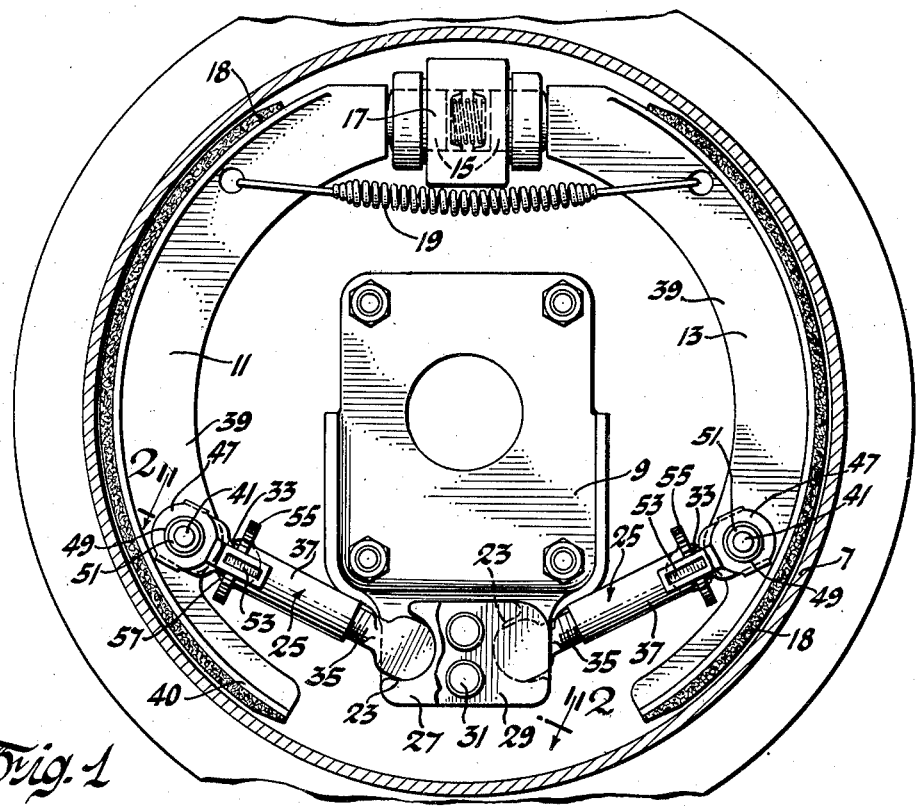

Referring by reference characters to the drawing, numeral 7 is used to designate a drum rotatable with a wheel (not shown). At 9 is a fixed plate serving as an anchorage to receive the torque of brake application. Numerals 11 and 13 are used to mark the two shoes which are to be spread into contact with the drum. The applying means includes two pistons 15 operable within a wheel cylinder 17. This wheel cylinder need not be described inasmuch as it is the part of the conventional hydraulic brake applying means. Numeral 18 is used to designate the lining on the two shoes. A retracting spring is shown at 19, this spring being used to withdraw the shoes from contact with the drum after the brake has been applied. The anchorage plate 9 is formed to receive the thrust of articulating links 25. The thrust means includes plates 27 which are secured together, with a closure plate 29, to the plate 9 by fastening means 31.

Each link 25 is formed of two axially aligned parts 33 and 35. These parts are externally threaded with right and left hand threads and coupled by an internally threaded sleeve 37. The end of part 35 is rounded and received in socket 23. Part 33 is hollow and its end is flattened so that its side walls straddle the web 39 of the shoe and are pivoted to the web at a point between the center of the arc of the shoe and the end 40. A shouldered pivot pin 41 passes through suitable apertures in the web of the shoe and the walls of the part 33. Adjacent one wall of part 33 is a washer 43 received within a slot 45 of the pin. Engaging the other wall of part 33 is a stamping 47, itself engaged with one end of a coil spring 49, the latter being in abutment with a washer 51 held by another slot in the pivot pin. Stamping 47 is angularly shaped as shown in the drawing and its end is indented as at 53 to engage teeth 55 formed on a radial flange of the sleeve 37. The fixed abutment plate 9 has a covered opening 57 to afford access to the teeth 55.

As stated above, the invention provides a convenient means for adjusting the clearance between the lining of the shoes and the inner surface of the drum annulus.

The adjustment described is particularly useful for a brake of the kind described where the rotation of the shoes to effect braking action is accomplished by a rocking of the rounded end of the link in the socket 23, but wherein, in the event of changes in the coefficient of friction between the lining and the drum resulting in a change in the ratio between the applying force and the force of self-actuation, there will be more or less rotation about the pivot 41 to so correct the angular movement between the shoe and the link as to relocate the high pressure point along the arc of the shoe and to most effectively distribute the braking action. With such a shoe assembly it is found very convenient merely to extend the length of the articulating link to offset wear of the lining carried by the shoe. Such an adjustment is easily made by engaging a suitable tool with the teeth 55, the tool being projected through the opening 57.

Figure 2:
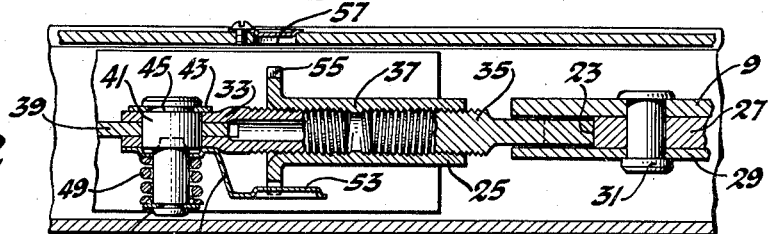
Fig. 2 is a section on line 2—2 of Fig. 1.
Figure 3:
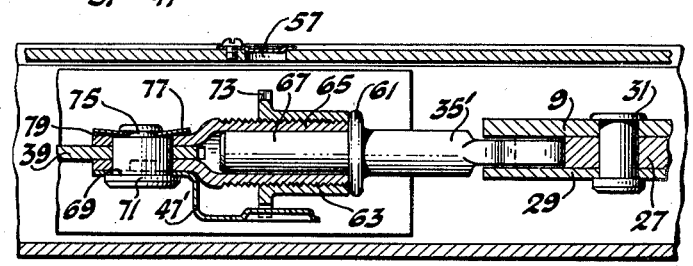
Fig. 3 is a section corresponding to Fig. 2 but showing a slight modification.

In Fig. 3, part 35' is socketed as before in part 27 between the plates 9 and 29. It has an enlargement or flange 61 engaged by a sleeve 63 threaded upon the aligned link 65. This latter is tubular in form and adapted to receive the end 67 of part 35'. Its pivot end portion is related to web 39 in the same way as is shown in Fig. 2. The shoulder 69 of pivot pin 71 engages the end of a modified stamping 47' which is related to the teeth 73 of sleeve 63 as before described. The teeth are reached through an opening 57 as in the form previously described. The pivot pin has a slot 75 seating a flat spring 77, engaging a flat face 79 at the end of part 65, serving in this way to hold the parts resiliently in frictional contact. Rotation of sleeve 63 on part 65 serves in an obvious manner to vary the length of the articulating link connecting the shoe and the plate 9.

We claim:

A brake mechanism comprising a fixed backing plate, a rotatable drum, a pair of shoes to engage the drum, floating applying means between one pair of adjacent ends of said shoes, means to anchor said shoes on said backing plate, said anchoring means consisting of links pivoted to said backing plate and to said shoes, the pivotal connection with said shoes being between their centers and their opposite ends, said links being adjustable in length, together with yielding means effecting frictional drag adjacent the pivotal connection between each link and the shoe, an element through which said yielding means operates as stated, said element also functioning in addition thereto to retain said links in selected positions of adjustment.

OLAF RASMUSSEN.
GILBERT K. HAUSE.